(12) United States Patent
Ieda et al.

(10) Patent No.: US 9,108,591 B2
(45) Date of Patent: Aug. 18, 2015

(54) DOOR HANDLE APPARATUS FOR VEHICLE (75) Inventors: Kiyokazu Ieda, Kariya (JP); Eiji Mushiake, Chita-gun (JP); Hisashi Inaba, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 2419 days.

(21) Appl. No.: 11/898,342

(22) Filed: Sep. 11, 2007

(65) Prior Publication Data

US 2008/0061933 A1 Mar. 13, 2008

(30) Foreign Application Priority Data

Sep. 13, 2006 (JP) ................................ 2006-248178

(51) Int. Cl.
*B60R 25/00* (2013.01)
*B60R 25/24* (2013.01)
*E05B 81/78* (2014.01)
*G07C 9/00* (2006.01)
*E05B 77/34* (2014.01)

(52) U.S. Cl.
CPC ............... *B60R 25/246* (2013.01); *E05B 81/78* (2013.01); *E05B 77/34* (2013.01); *E05B 81/77* (2013.01); *G07C 9/00309* (2013.01); *G07C 2209/65* (2013.01)

(58) Field of Classification Search
CPC ................................. B60R 25/46; E05B 81/78
USPC ......................................................... 340/5.72
See application file for complete search history.

(56) References Cited

U.S. PATENT DOCUMENTS 2,658,376 A * 11/1953 Shank .............................. 70/455
3,784,768 A * 1/1974 Hunt ............................ 200/52 R
3,995,140 A * 11/1976 Kuiff et al. ..................... 219/203
4,274,123 A * 6/1981 Rogers, Jr. ..................... 361/232

(Continued)

FOREIGN PATENT DOCUMENTS

EP         1 164 240 A2    12/2001
JP       2003-221947 A      8/2003

(Continued)

OTHER PUBLICATIONS

Search Report and Written Opinion issued by the French Patent Office in corresponding French Patent Application No. 07 06163, Jan. 4, 2010, Institut National de la Propriété Industrielle of France, Paris, FR; and an English-language translation of the Search Report.

(Continued)

*Primary Examiner* — Benjamin C Lee
*Assistant Examiner* — Stephen Burgdorf
(74) *Attorney, Agent, or Firm* — Buchanan Ingersoll & Rooney PC (57) ABSTRACT

A door handle apparatus for a vehicle includes a door handle adapted to be provided at a vehicle exterior of a vehicle door and operated in order to open/close the vehicle door, a sensing electrode provided inside of an upper-outer surface of the door handle, a sensor for detecting a user approaching the sensing electrode on the basis of a variation of an electric capacitance generated by the sensing electrode, controlling device for controlling the vehicle door so as to be locked/unlocked on the basis of information detected by the sensor and water-removing device provided on the upper-outer surface of the door handle in order to remove water retained in the vicinity of the sensing electrode.

12 Claims, 5 Drawing Sheets

(56) References Cited

U.S. PATENT DOCUMENTS

| | | | | |
|---|---|---|---|---|
| 5,127,686 | A | * | 7/1992 | Gleason et al. ............... 292/216 |
| 5,421,659 | A | * | 6/1995 | Liang ........................... 400/472 |
| 5,681,122 | A | * | 10/1997 | Burke ........................... 400/472 |
| 5,682,788 | A | * | 11/1997 | Netzer ............................. 73/73 |
| 5,810,491 | A | * | 9/1998 | Muller et al. .................. 400/496 |
| 6,156,987 | A | * | 12/2000 | Warne ........................... 200/512 |
| 6,515,491 | B1 | * | 2/2003 | Kupzig et al. .................. 324/686 |
| 7,190,089 | B2 | * | 3/2007 | Eidesheim et al. ............. 307/9.1 |
| 8,346,467 | B2 | * | 1/2013 | Vaysse et al. .................. 701/301 |
| 2002/0114125 | A1 | * | 8/2002 | Toyoda et al. ................. 361/286 |
| 2003/0007323 | A1 | * | 1/2003 | Huang et al. .................. 361/683 |
| 2003/0107473 | A1 | * | 6/2003 | Pang et al. ................... 340/5.72 |
| 2003/0128116 | A1 | * | 7/2003 | Ieda et al. .................... 340/562 |
| 2003/0184523 | A1 | * | 10/2003 | Badaye et al. ................ 345/173 |
| 2003/0216817 | A1 | * | 11/2003 | Pudney ............................ 700/17 |
| 2005/0068045 | A1 | * | 3/2005 | Inaba et al. ................... 324/678 |
| 2005/0083174 | A1 | * | 4/2005 | Nakamura et al. ........... 340/5.72 |
| 2005/0202779 | A1 | * | 9/2005 | Smith ........................... 454/365 |
| 2005/0219043 | A1 | * | 10/2005 | Pollmann et al. ........ 340/426.28 |
| 2005/0230237 | A1 | | 10/2005 | Ieda et al. |
| 2007/0091627 | A1 | | 4/2007 | Nitawaki et al. |

FOREIGN PATENT DOCUMENTS

| | | |
|---|---|---|
| JP | 2005-9216 A | 1/2005 |
| JP | 2005-98107 A | 4/2005 |
| JP | 2005-307463 A | 11/2005 |
| WO | WO2005116376 | * 12/2005 |

OTHER PUBLICATIONS

U.S. Appl. No. 11/628,027, filed Nov. 30, 2006, Kiyokazu et al.
U.S. Appl. No. 11/715,369, filed Mar. 8, 2007, Tanimoto et al.
U.S. Appl. No. 17/711,014, filed Feb. 27, 2007, Tanimoto et al.
Chinese Office Action issued May 25, 2011 by the Intellectual Property Office of People's Republic of China in Chinese Patent Application No. 200710145343.7 and English language translation of Chinese Office Action.
Official Action issued on Sep. 1, 2011 by the Japanese Patent Office in corresponding Japanese Patent Application No. 2006-248178, and English language translation of the Official Action.

* cited by examiner

DOOR HANDLE APPARATUS FOR VEHICLE

CROSS REFERENCE TO RELATED APPLICATIONS

This application is based on and claims priority under 35 U.S.C. §119 to Japanese Patent Application 2006-248178, filed on Sep. 13, 2006, the entire content of which is incorporated herein by reference.

FIELD OF THE INVENTION

The present invention relates to a door handle apparatus for a vehicle by which the vehicle door is locked or unlocked.

BACKGROUND

A known door handle apparatus for a vehicle for automatically locking/unlocking the vehicle door generally includes a locking controlling system. Hereinafter the locking controlling system will be referred to as a smart entry system. Specifically, the smart entry system firstly recognizes a user approaching to/getting out of the vehicle by communicating with a portable device, which is carried by the user. Then, the smart entry system detects an user's operation for locking/unlocking the vehicle door. On the basis of the detected user's operation, the smart entry system controls the vehicle door so as to be locked or unlocked.

The door handle apparatus including the abovementioned smart entry system further includes a human detecting sensor. Specifically, the human detecting sensor is an electric capacitance type and is provided at a door handle by which the vehicle door is opened/closed by the user. Such door handle apparatus has been disclosed, for example in JP2003221947A. The door handle apparatus for a vehicle disclosed in JP2003221947A detects a user's operation at the door handle as follows. Generally, an electric capacitance is generated between a sensing electrode of the human detecting sensor and the vehicle door, and a level of the electric capacitance changes when a user's hand approaches the sensing electrode of the human detecting sensor provided at the door handle. In this configuration, the door handle apparatus disclosed in JP200322194A detects the user's operation at the door handle by detecting the change of the level of the electric capacitance.

According to the known door handle apparatus disclosed in JP200322194A, the sensing electrode of the human detecting sensor is provided at an outer portion of the door handle, the outer portion not facing the vehicle door. In this structure, the human detecting sensor may incorrectly detect the user's operation at the door handle when the user's body unconsciously approaches the door handle or when the user's body accidentally contacts the detecting portion of the human detecting sensor of the door handle.

In order to reduce such incorrect detection, the sensing electrode of the human detecting sensor may be provided in the vicinity of an upper portion of the door handle so that the user's body may not accidentally contact the detecting portion of the human detecting sensor. However, if the human detecting sensor is provided at the upper portion of the door handle, water (e.g., rain drops of water) may be retained on the detecting portion of the human detecting sensor. In this configuration, the human detecting sensor may incorrectly detect the water as the user's operation.

A need thus exists for a door handle apparatus for a vehicle which is not susceptible to the drawback mentioned above.

SUMMARY OF THE INVENTION

According to an aspect of the present invention, a door handle apparatus for a vehicle includes a door handle adapted to be provided at a vehicle exterior of a vehicle door and operated in order to open/close the vehicle door, a sensing electrode provided inside of an upper-outer surface of the door handle, a sensor for detecting a user approaching the sensing electrode on the basis of a variation of an electric capacitance generated by the sensing electrode, controlling means for controlling the vehicle door so as to be locked/unlocked on the basis of information detected by the sensor and water-removing means provided on the upper-outer surface of the door handle in order to remove water retained in the vicinity of the sensing electrode.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of a door handle apparatus for a vehicle related to the present invention will be explained in accordance with the attached drawings. In this embodiment, the present invention is applied to a smart entry system.

[System Configuration]

The smart entry system related to the present invention recognizes that a user (e.g., a driver) carrying a portable device 5 approaches the vehicle or moves toward the exterior of the vehicle. Then, the smart entry system automatically controls a vehicle door 6 so as to be locked or unlocked. The portable device 5 may also be referred to as a remote controller.

The portable device 5 carried by the user includes a receiving system 52, a sending system 53 and a signal processing CPU 51. Specifically, the receiving system 52 is comprised of, for example, a tuner and an antenna for receiving a signal as a radio wave from the vehicle. The sending system 53 is comprised of, for example, a modulation circuit and an antenna for sending a signal as a radio wave to the vehicle. The signal processing CPU 51 executes a signal processing to control for sending/receiving a signal, determine the signal received by the receiving system 52 and generate the signal sent by the sending system 53.

Within a vehicle interior 7, a system ECU (Electronic Control Unit) 1, a receiving antenna 75, a tuner 71, a vehicle interior sending antenna 73 and a vehicle interior driver 72 are provided. The system ECU (Electronic Control Unit) 1 serves as a controlling means for executing a general control of the smart entry system, the receiving antenna 75 receives the signal sent from the portable device 5, the tuner 71 executes a predetermined signal processing for the signal received by the receiving antenna 75, the vehicle interior sending antenna 73 sends a signal to the portable device 5, the vehicle interior driver 72 executes a signal processing by which the signal is modulated, amplified and the like, and then the signal is sent by means of the vehicle interior sending antenna 73.

Figure 1:
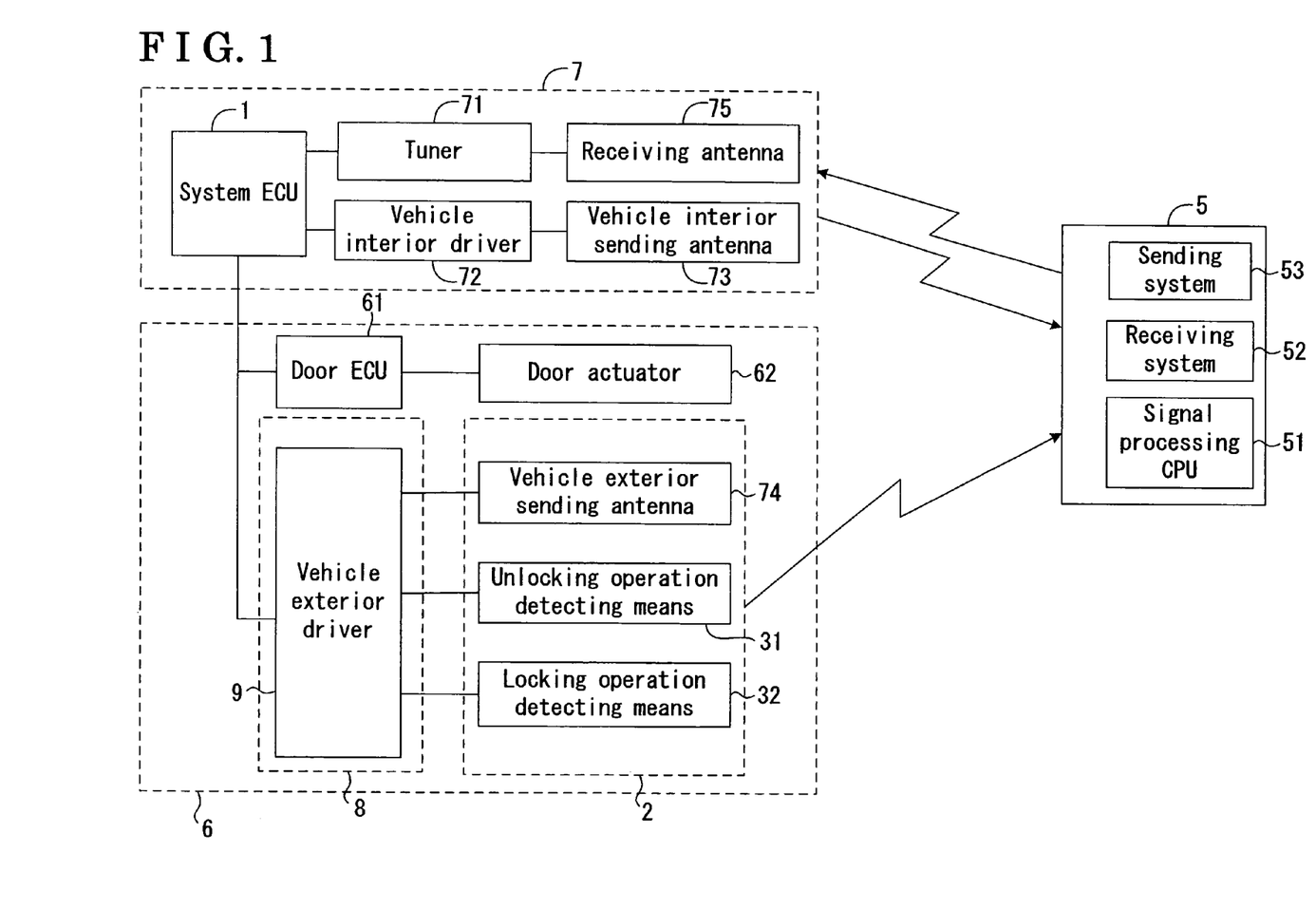
FIG. 1 illustrates a diagram indicating an example of a system configuration related to the embodiment of the present invention.
Figure 2:
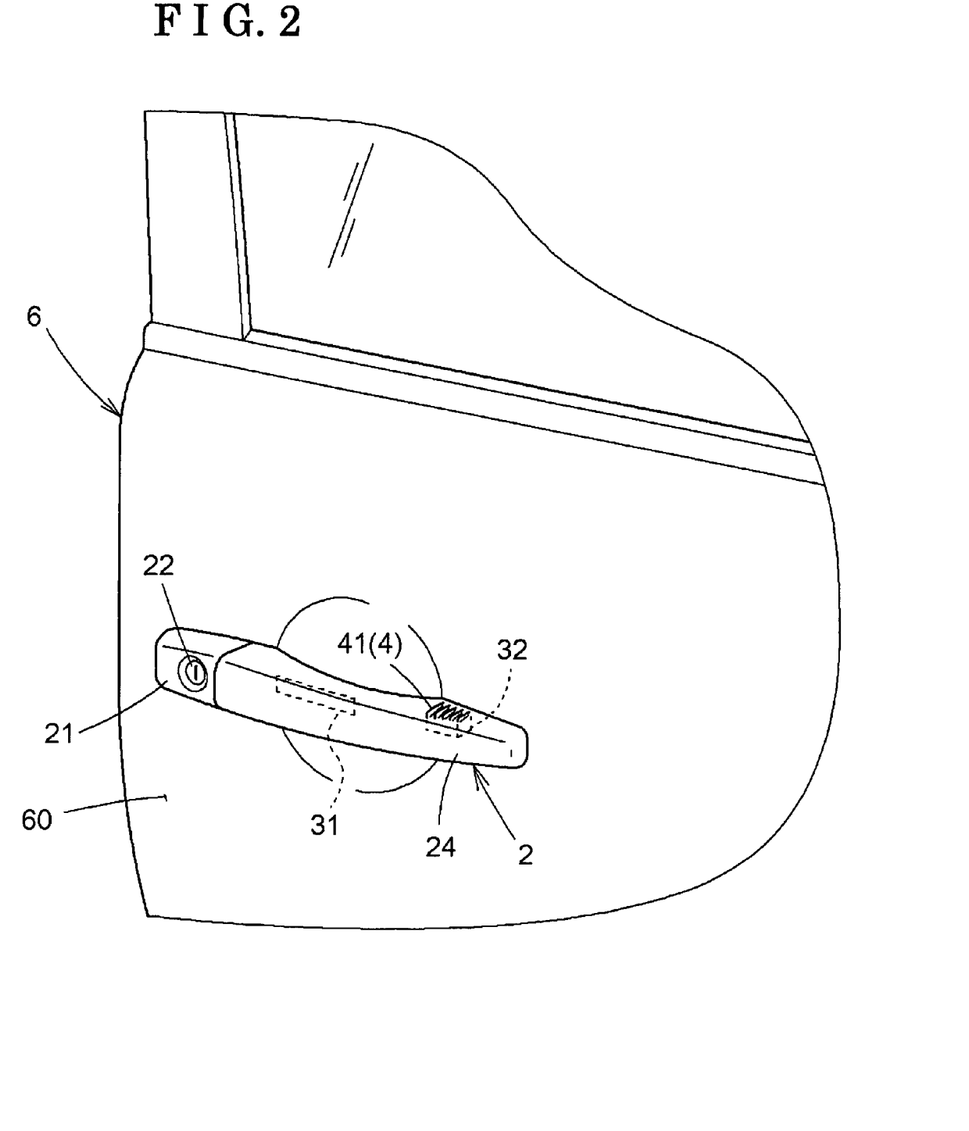
FIG. 2 illustrates an oblique perspective view indicating an example of the vehicle door related to the embodiment of the present invention.

As illustrated in FIGS. 1 and 2, a door handle 2 is provided at a door panel 60 of the vehicle door 6 at the vehicle exterior thereof. The vehicle door 6 is opened/closed by operating the door handle 2. The door handle 2 includes a vehicle exterior sending antenna 74, an unlocking operation detecting means 31 and a locking operation detecting means 32. Specifically, the vehicle exterior sending antenna 74 sends a signal to the portable device 5, and the unlocking operation detecting means 31 and the locking operation detecting means 32 detect a user's operation at the door handle 2. The door handle 2 is supported by the vehicle door 6 by means of a handle frame 8, and a vehicle exterior driver 9 is provided within the handle frame 8. A signal is transmitted between the system ECU 1 and each of the vehicle exterior sending antenna 74, the unlocking operation detecting means 31 and the locking operation detecting means 32 via the vehicle exterior driver 9. Further, within the door panel 60 of the vehicle door 6, a door actuator 62 and a door ECU 61 are provided. Specifically, the door actuator 62 actuates a lock mechanism of the vehicle door 6 in order to lock/unlock the vehicle door 6, and the door ECU 61 controls the door actuator 62. The door ECU 61 and the vehicle exterior driver 9 are controlled by the system ECU 1.

The system ECU 1 communicates with the portable device 5 by sending/receiving a signal (e.g., communication signal) via a communicating means provided at the vehicle interior 7 or the vehicle door 6. The communication signal can be received within a predetermined range around the vehicle door, and when the communication signal is received by the system ECU 1, the system ECU 1 recognizes that the portable device 5 exists within the predetermined range. For example, when the portable device 5, which has not been receiving the communication signal from the vehicle exterior sending antenna 74, receives the communication signal from the vehicle exterior sending antenna 74, the system ECU 1 recognizes that the portable device 5 is moved from the outside of the range into the inside of the range, specifically, the system ECU 1 recognizes that a user carrying the portable device 5 is approaching the vehicle. On the other hand, when the portable device 5, which has been receiving the communication signal from the vehicle interior sending antenna 73, stops receiving the communication signal from the vehicle interior sending antenna 73, the system ECU 1 recognizes that the portable device 5 is moved from the vehicle interior to the vehicle exterior, specifically, the system ECU 1 recognizes that a user carrying the portable device 5 gets out of the vehicle.

[Configuration of Elements]

Figure 3:
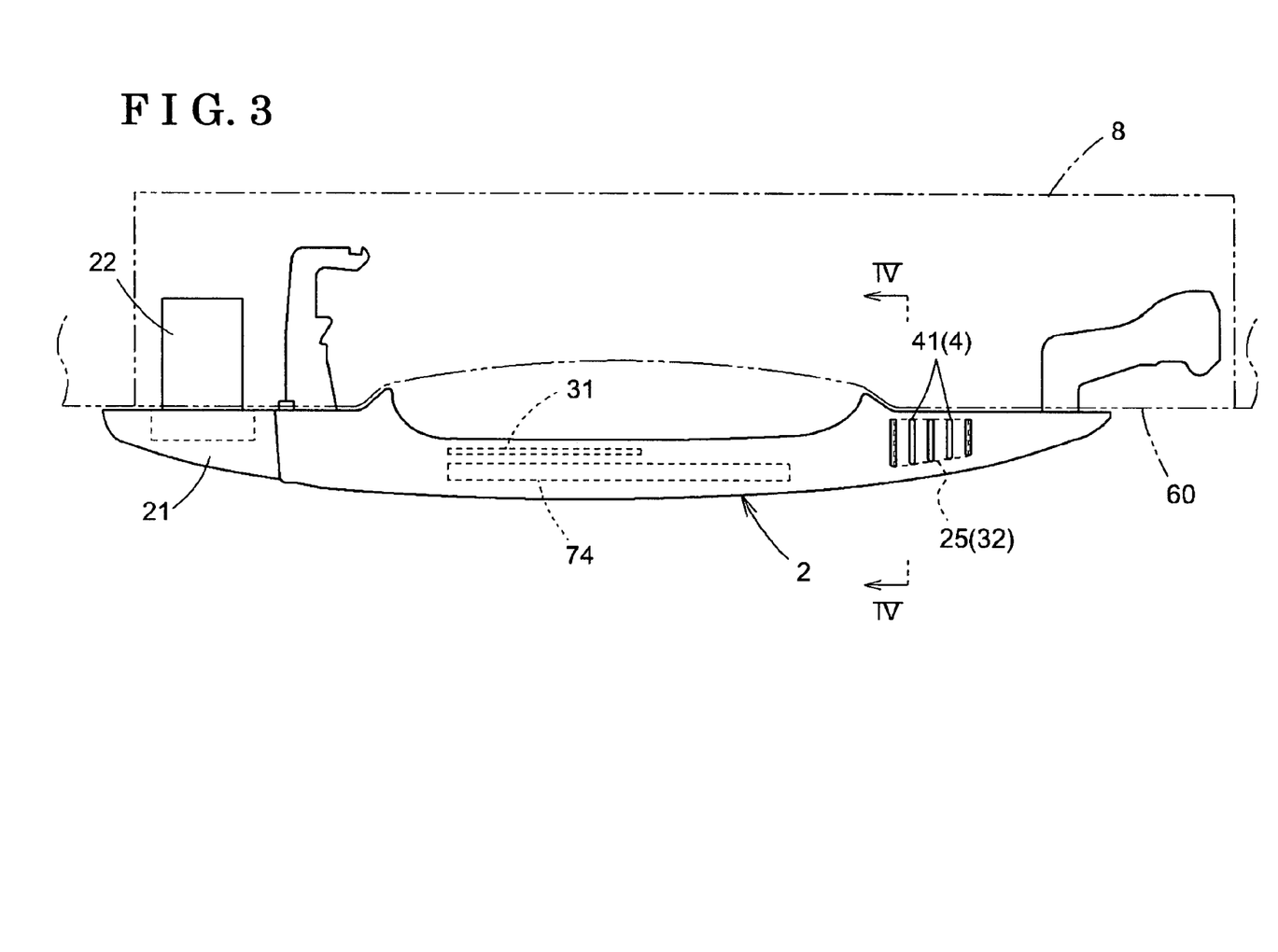
FIG. 3 illustrates an explanation view of the door handle related to the embodiment of the present invention.

As illustrated in FIG. 3, the door handle 2 is supported by the handle frame 8, and the door panel 60 is located between the door handle 2 and the handle frame 8. Further, a handle cap 21 is supported by the handle frame 8. The handle cap 21 includes a key cylinder 22 that is used when the vehicle door 6 is manually and mechanically locked/unlocked by the user.

The vehicle exterior driver 9 is provided inside of the handle frame 8 (not shown in FIG. 3), and the vehicle exterior driver 9 is connected to each of the vehicle exterior sending antenna 74, the unlocking operation detecting means 31 and the locking operation detecting means 32, and is further connected to the system ECU 1 provided at the vehicle interior (not shown in FIG. 3).

Within the door handle 2, the vehicle exterior sending antenna 74, the unlocking operation detecting means 31 for detecting the unlocking operation and the locking operation detecting means 32 for detecting the locking operation are provided. The vehicle exterior sending antenna 74 may be a loop antenna using, for example a ferrite, however, it is not limited so long as the vehicle exterior sending antenna 74 corresponds to an appropriate frequency band and is provided within the door handle 2.

Each of the unlocking operation detecting means 31 and the locking operation detecting means 32 uses an electric capacitance type-human detecting sensor. Specifically, such human detecting sensor detects a human approaching the vehicle on the basis of a variation of electric capacitance generated between the door panel 60 of the vehicle door 6 and each of the unlocking operation detecting means 31 and the locking operation detecting means 32. More specifically, the unlocking operation detecting means 31 is provided at a surface facing the door handle 2, specifically, the unlocking operation detecting means 31 is provided where the door handle 2 faces the door panel 60 (vehicle door 6) so that the unlocking operation is accurately detected when the user comes in contact with the door handle 2 in order to open the vehicle door 6.

Figure 4:
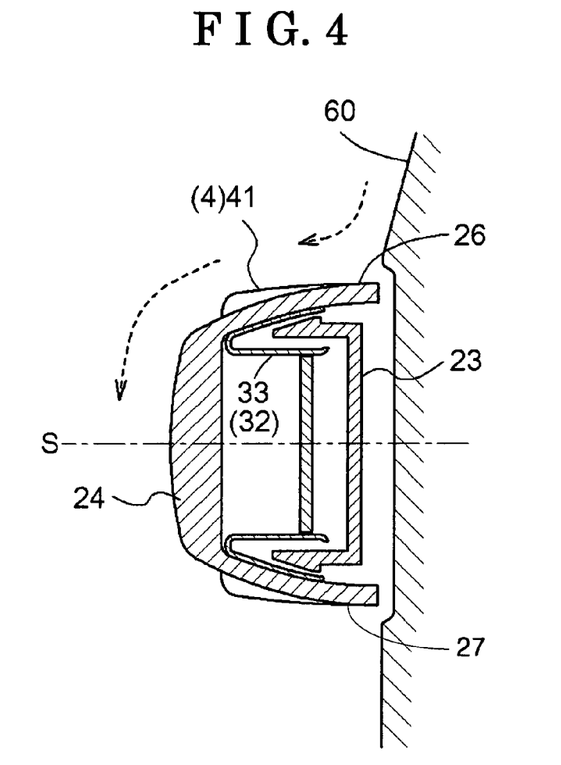
FIG. 4 illustrates a cross section of the door handle seen from a line IV-IV indicated in FIG. 3.

The locking operation detecting means 32 includes a sensing electrode 33 as illustrated in FIG. 4. The locking operation detecting means 32 is provided in the vicinity of an upper-outer surface of the door handle 2 in order to detect that the user intentionally comes in contact with a detecting position thereof by their fingers or the user's finger approaches the detecting position, after the user gets out of the vehicle and closes the vehicle door 6. In this configuration, even when the user unintentionally comes in contact with the door handle 2, because the detecting position of the locking operation detecting means 32 is placed where the user can hardly come in contact, the vehicle door 6 is prevented from being unintentionally locked by the user. In the embodiment of the present invention, the locking operation detecting means 32 corresponds to a sensor.

In the embodiment, the door handle 2 includes a base member 23 supported by the vehicle door 6 and a handle unit 24 fitted to the base member 23 as illustrated in FIG. 4. At an upper portion of the handle unit 24 of the door handle 2, an upper tapered surface 26 is formed as an upper-outer surface in a manner where it tapers downward from the side of the door panel 60 toward the vehicle exterior. On the upper tapered surface 26, water-removing means 4 are formed in order to remove water retained in the vicinity of the locking operation detecting means 32.

In the embodiment, the water-removing means 4 include projecting portions 41 formed on the upper tapered surface 26 so as to extend along a tapered direction thereof. The projecting portions 41 are formed so as to be equally spaced from each other. More specifically, the projecting portions 41 are formed within an entire area where the detecting position of the door handle 2 is located. A detecting surface 25 of the locking operation detecting means 32 is located at the detecting position. In this configuration, drops of water on the detecting surface 25 of the locking operation detecting means 32 contact the projecting portions 41 so that the drops of water move downward so as to be gathered due to surface tensions. Because of their own weight, the gathered drops of water easily flow on the upper tapered surface 26, as a result, the water retained on the detecting surface 25 is removed. Accordingly, the locking operation detecting means 32 may be prevented from incorrectly detecting the water on, for example the detecting surface 25, from a user' operation. Further, the detection of the user's operation may be prevented from becoming difficult due to the drops of water retaining in the space between the door panel 60 and the detecting surface 25. Furthermore, because the water-removing means 4 are provided within the entire range where the detecting surface 25 of the water-removing means 4 are, the water-removing means 4 function as marks indicating the detecting position where the detecting surface 25 of the water-removing means 4 are, so that the user clearly finds the detecting position where the user needs to come in contact with or approach his/her fingers.

In the embodiment, the taper surface and the water-removing means 4 are provided at a lower portion of the handle unit 24 so that the shape of the door handle 2 is symmetrical relative to a reference plane S indicated in FIG. 4, the reference plane S extending in a longitudinal direction of the door handle 2. In this configuration, the door handle 2 may be applied to both right hand and left hand vehicle doors 6, as a result, there is no need to manufacture two types of the door handle 2, one of which is applied to the right hand vehicle door 6, and the other of which is applied to the left hand vehicle door 6. Further, the number of the door handles need not to be controlled, and furthermore, production costs of the door handle 2 may be reduced.

[Locking/Unlocking Operation]

The locking/unlocking operation for the vehicle door 6 by means of the smart entry system having the abovementioned configuration will be explained below. While the vehicle is parked, and the vehicle door is locked, the system ECU 1 outputs a request signal to the vehicle exterior driver 9 provided within the door panel 60 of the vehicle door 6 in order to recognize the portable device 5 functioning as an electronic key registered for the vehicle. A amplifier for sending (not shown) in the vehicle exterior driver 9 modulates and amplifies the request signal. The modulated and amplified signal is sent as a radio wave from the vehicle exterior sending antenna 74 provided at the door handle 2 to the outside of the vehicle. At this point, if the portable device 5 approaches the vehicle, the receiving system 52 of the portable device 5 receives the radio wave sent by the vehicle exterior sending antenna 74. Then, the portable device 5 executes a signal processing for the received signal at the signal processing CPU 51 and sends return information by means of the sending system 53. Specifically, the return information includes a characteristic of the received signal, a registered code and the like. More specifically, the characteristic includes information indicating where the received signal comes from, for example from the vehicle exterior sending antenna 74. At the vehicle side, the signal sent from the portable device 5 as a radio wave is received by the tuner 71 via the receiving antenna 75, and the system ECU 1 confirms the characteristic, the registered code and the like included in the return information and recognizes that the portable device 5 functioning as the electronic key registered for the vehicle is approaching the vehicle. After the system ECU 1 recognizes the portable device 5, the smart entry system enters an unlocking mode.

During the unlocking mode, when the user executes the unlocking operation, such as putting his/her hand on the door handle 2, the unlocking operation detecting means 31 detects the unlocking operation and sends the detection signal to the system ECU 1 via the vehicle exterior driver 9. Then, the system ECU 1 instructs the unlocking control to the door ECU 61 on the basis of the detection signal and controls the door actuator 62 to drive so as to unlock the vehicle door 6.

When the user is within the vehicle interior, the portable device 5 (electronic key) carried by the user is also within the vehicle interior. In this situation, the portable device 5 receives the request signal modified and amplified by the vehicle interior driver 72 provided within the vehicle interior and sent by the vehicle interior sending antenna 73 provided at the vehicle interior. The portable device 5 executes the signal processing for the received signal at the signal processing CPU 51 and sends return information via the sending system 53. The return information includes a characteristic of the received signal, the registered code and the like. The radio wave of the signal sent by the portable device 5 is received by the tuner 71 via the receiving antenna 75, and the system ECU 1 confirms the return information and recognizes that the portable device 5 is within the vehicle interior. In this condition, when the user carrying the portable device 5 gets out of the vehicle and closes the vehicle door 6, the abovementioned communication is ended, and then a communication between the vehicle exterior sending antenna 74 and the portable device 5 is established. As a result, the system ECU 1 recognizes that the portable device 5 is moved from the vehicle interior to the vehicle exterior. When it is confirmed that the user gets out of the vehicle, and the vehicle door 6 is closed by the user, the smart entry system enters the locking mode.

In the locking mode, when the user executes the locking operation such as approaching the detecting position of the door handle 2, the locking operation detecting means 32 detects the locking operation and outputs the detection signal to the system ECU 1 via the exterior driver 9. On the basis of the detection signal, the system ECU 1 instructs the locking control to the door ECU 61 so that the door actuator 62 is driven so as to lock the vehicle door 6.

[Other Embodiments]

Figure 5:
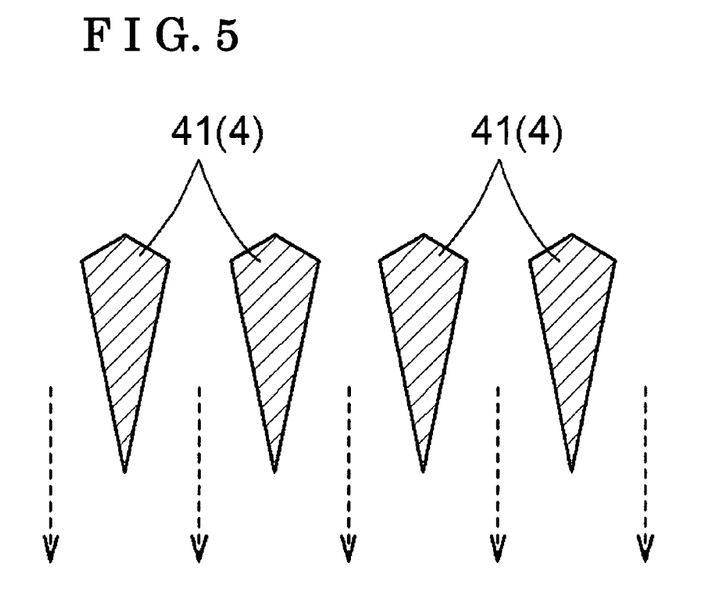
FIG. 5 illustrates an explanation view indicating water-removing means related to another embodiment of the present invention.

In the above embodiment, as the water-removing means 4, the projecting portions 41 are formed so as to extend in the tapered direction of the upper tapered surface 26 and equally spaced from each other. However, as illustrated in FIG. 5, each of the projecting portions 41 may be formed in a manner where their width smoothly vary. Specifically, in this case, a water passage formed between the projecting portions 41 is gradually widened toward the lower portion of the taper. Thus, drops of water move toward each of the projecting portions 41 so as to be gathered due to surface tensions at the upper portion of the taper. Then, because of their own weight, the gathered drops of water easily flow at the lower portion of the taper. Thus, the drops of water may flow more smoothly.

Figure 6:
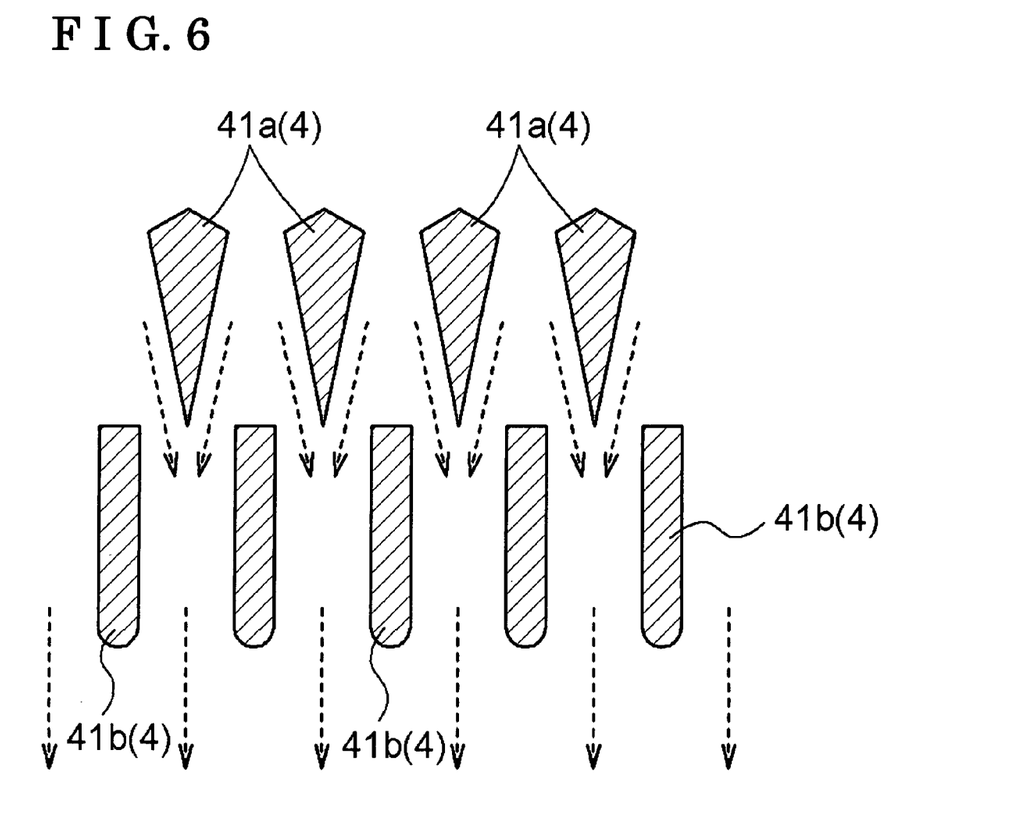
FIG. 6 illustrates an explanation view indicating water-removing means related to another embodiment of the present invention.

Further, as the water-removing means 4, projecting portions 41a and 41b may be formed respectively so as to extend in the taper direction of the upper tapered surface 26 as illustrated in FIG. 6. Specifically, each of the projecting portions 41a is formed at the upper portion of the taper, where the taper is relatively smooth, in a manner where its width is smoothly reduced, and each of the projecting portions 41b is formed below the projecting portions 41a, where the taper is relatively steep, in a manner where its width is even. In other words, a water passage formed between the projecting portions 41a on the smooth taper is gradually widened toward the lower portion of the taper, and a water passage formed between the projecting portions 41b on the steep taper is even. Thus, drops of water move toward each of the projecting portions 41a so as to gather due to surface tensions at the upper portion of the taper. Then, because of it's own weight, the gathered drops of water easily flow at the lower portion of the taper. Thus, the drops of water may flow more smoothly.

Figure 7:
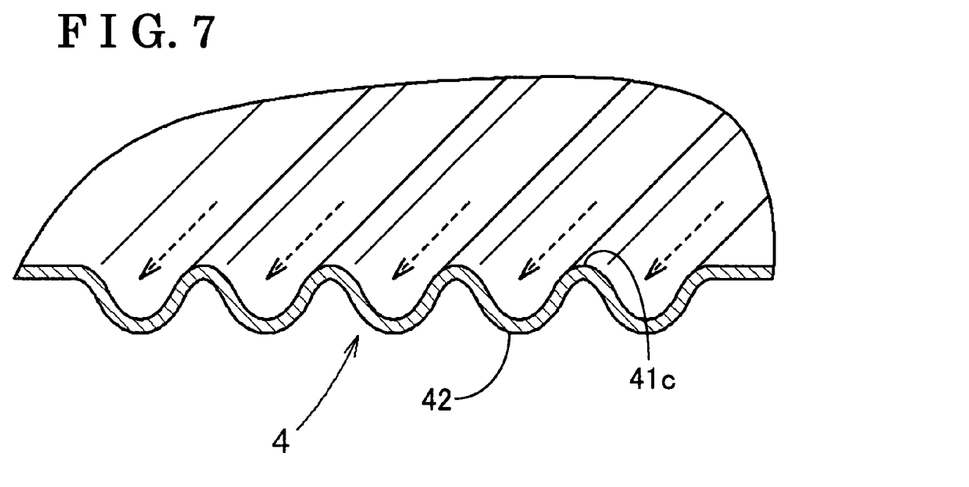
FIG. 7 illustrates an explanation view indicating water-removing means related to another embodiment of the present invention.

Further, the water-removing means 4 may be formed so as to have grooves lying as ripples. Furthermore, the water-removing means 4 may be formed so as to integrally have plural projecting portions 41c and plural recessed portions 42 as illustrated in FIG. 7. In those configurations, because drops of water gather on the grooves or the recessed portions, the gathered drops of water may smoothly flow toward the lower portion of the taper. The water-removing means 4 are not limited to the abovementioned configurations and may be modified depending on a level of the taper of the upper tapered surface 26 or an area of the detecting surface 25. The shape, width, height and number of the water-removing means 4 may be set to an appropriate value according to a structure of the door handle.

In the embodiment, the water-removing means 4 are formed within the entire area where the detecting surface 25 is located, however, the water-removing means 4 may be formed at other places as long as the water being retained is removed. For example, the water-removing means may be formed at an upper portion of the area where the detecting surface 25 is located, or may be formed above the area where the detecting surface 25 is located. In those configurations, drops of water move toward each of the water-removing means 4 so as to be gathered due to surface tensions. Then, because of it's own weight, the gathered drops of water become easy to flow at the lower portion of the upper tapered surface 26. As a result, the water retained in the vicinity of the detecting surface 25 is removed.

In the embodiment, the door handle 2 is formed so as to be symmetrical relative to the reference plane S extending in the longitudinal direction of the door handle 2, however, the structure of the door handle 2 is not limited to the embodiment. For example, the water-removing means 4 may be provided at least at the upper tapered surface 26 of the door handle 2.

In addition, in the embodiment, the water-removing means 4 are provided at the upper tapered surface 26 of the door handle 2, however, water-repellent means, heating means, vibrating means or the like may be used as the water-removing means 4. Further, in the embodiment, the water-removing means 4 are provided at the tapered surface, however, the water-removing means 4 may be provided at another place as long as the water retained in the vicinity of the detecting surface 25 is removed.

According to the embodiment of the present invention, a door handle apparatus for a vehicle includes a door handle 2 adapted to be provided at a vehicle exterior of a vehicle door 6 and operated in order to open/close the vehicle door 6, a sensing electrode 33 provided inside of an upper-outer surface 26 of the door handle 2, a locking operation detecting means 32 for detecting a user approaching the sensing electrode on the basis of a variation of an electric capacitance generated by the sensing electrode, a system ECU 1 for controlling the vehicle door 6 so as to be locked/unlocked on the basis of information detected by the locking operation detecting means 32; and water-removing means 4 provided on the upper-outer surface 26 of the door handle 2 in order to remove water retained in the vicinity of the sensing electrode 33.

In this configuration, because the water-removing means 4 is formed on the upper-outer surface 26 of the door handle 2 in the vicinity of the sensing electrode 33, the water retained in the vicinity of the sensing electrode 33 of the door handle 2 may be removed. Thus, the sensing electrode 33 is prevented from incorrectly detecting the water such as rain drops as the user' operation.

According to the embodiment of the present invention, the upper-outer surface 26 includes a tapered surface, and the water-removing means 4 includes a projecting portion 41 formed so as to extend along a tapered direction of the tapered surface.

In this configuration, because the upper-outer surface 26 is tapered, and the projecting portion 41 is formed in the taper direction of the tapered surface, drops of water existing in the vicinity of the sensing electrode 33 contact the projecting portions 41 so that the drops of water move toward each of the projecting portions 41 so as to be gathered due to surface tensions. Because of it's own weight, the gathered drops of water easily flow on the upper tapered surface, as a result, the water retained in the vicinity of the sensing electrode 33 is removed.

According to the embodiment of the present invention, the water-removing means 4 is provided within an entire area in which a detecting surface 25 of the sensing electrode 33 is located.

In this configuration, because the water-removing means 4 is formed within the entire area where the detecting surface 25 of the sensing electrode 33 exists, the water can be removed from the detecting surface 25.

According to the embodiment of the present invention, the projecting portion 41 is formed so as to be narrower toward a lower portion of the tapered surface, and a plurality of the projecting portions 41 is provided in a manner where a space therebetween is formed so as to be wider toward the lower portion of the tapered surface.

In this configuration, a water passage formed between the projecting portions 41 is gradually widened toward the lower portion of the taper. Thus, drops of water move toward each of the projecting portions 41 so as to be gathered due to surface tensions at the upper portion of the taper. Then, because of it's own weight, the gathered drops of water easily flow at the lower portion of the taper. Thus, the drops of water may flow more smoothly.

According to the embodiment of the present invention, a plurality of the projecting portions 41a and 41b is provided so as to form plural rows.

In this configuration, the projecting portions 41a are formed at the upper portion of the taper, where the taper is relatively smooth, in a manner where its width is smoothly reduced, and also another projecting portions 41b are formed below the projecting portions 41a, where the taper is relatively steep, in a manner where its width is even. In other words, a water passage formed between the projecting portions 41a on the smooth taper is gradually widened toward the lower portion of the taper, and a water passage formed between the projecting portions 41b on the steep taper is even. Thus, drops of water moves toward each of the projecting portions 41a so as to be gathered due to surface tensions at the upper portion of the taper. Then, because of it's own weight, the gathered drops of water easily flow at the lower portion of the taper. Thus, the drops of water may flow more smoothly.

According to the embodiment of the present invention, the water-removing means 4 includes plural projecting portions 41c and plural recessed portions 42 reiterating in a longitudinal direction of the door handle 2 and extending in the taper direction of the tapered surface.

In this configuration, because drops of water gather on the recessed portions 42, the gathered water may smoothly flow toward the lower portion of the taper.

According to the embodiment of the present invention, the water-removing means 4 is provided at each of the upper-outer surface 26 and a lower-outer surface 27 of the door handle so that the door handle 2 is symmetrical relative to a reference plane S extending in a longitudinal direction of the door handle 2.

In this configuration, the door handle 2 may be applied to both right hand and left hand vehicle doors 6, as a result, there is no need to manufacture two types of the door handle 2, one of which is applied to the right hand vehicle door 6, and the other of which is applied to the left hand vehicle door. Further, the number of the door handles need not to be controlled, and furthermore, production costs of the door handle 2 may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A door handle apparatus for a vehicle comprising:
    a door handle adapted to be provided at a vehicle exterior of a vehicle door and operated in order to open/close the vehicle door;
    a sensing electrode provided inside of an upper-outer surface of the door handle;
    a sensor for detecting a user approaching the sensing electrode on the basis of a variation of an electric capacitance generated by the sensing electrode;
    controlling means for controlling the vehicle door so as to be locked/unlocked on the basis of information detected by the sensor;
    water-removing means provided on the upper-outer surface of the door handle in order to remove water retained in the vicinity of the sensing electrode;
    wherein the upper-outer surface includes a tapered surface, and the water-removing means includes a projecting portion formed so as to extend along a tapered direction of the tapered surface; and
    wherein the projecting portion is formed so as to be narrower toward a lower portion of the tapered surface, and a plurality of the projecting portions is provided in a manner where a space therebetween is formed so as to be wider toward the lower portion of the tapered surface.

2. The door handle apparatus for the vehicle according to claim 1, wherein the water-removing means extends over an entire area in which a detecting surface of the sensing electrode is located.

3. The door handle apparatus for the vehicle according to claim 1, wherein the water-removing means is provided at each of the upper-outer surface and a lower-outer surface of the door handle so that the door handle is symmetrical relative to a center line extending in a longitudinal direction of the door handle.

4. A door handle apparatus for a vehicle comprising:
    a door handle adapted to be provided at a vehicle exterior of a vehicle door and operated in order to open/close the vehicle door;
    a sensing electrode provided inside of an upper-outer surface of the door handle;
    a sensor for detecting a user approaching the sensing electrode on the basis of a variation of an electric capacitance generated by the sensing electrode;
    controlling means for controlling the vehicle door so as to be locked/unlocked on the basis of information detected by the sensor;
    water-removing means provided on the upper-outer surface of the door handle in order to remove water retained in the vicinity of the sensing electrode; and
    wherein the water-removing means includes a projecting portion and a recessed portion, which extend in the taper direction of the tapered surface.

5. The door handle apparatus for the vehicle according to claim 4, wherein the projecting portion is formed so as to be narrower toward a lower portion of the tapered surface, and a plurality of the projecting portions is provided in a manner where a space therebetween is formed so as to be wider toward the lower portion of the tapered surface.

6. The door handle apparatus for the vehicle according to claim 4, wherein a plurality of the projecting portions is provided so as to form plural rows, with each row including a plurality of the projecting portions.

7. A door handle apparatus for a vehicle comprising:
    a door handle configured to be mounted at an exterior of a vehicle door and operated to open/close the vehicle door, the door handle possessing an upper surface facing upwardly when the door handle is mounted on the vehicle door;
    a sensing electrode located inside the door handle;
    a sensor for detecting a user approaching the sensing electrode based on a variation of an electric capacitance generated by the sensing electrode;
    controlling means for controlling the vehicle door to be locked/unlocked based on information detected by the sensor;
    a plurality of spaced apart projecting portions on the upper surface of the door handle and upstanding from the upper surface of the door handle to remove water retained in the vicinity of the sensing electrode; and
    wherein each of the spaced apart and adjacently positioned projecting portions possesses oppositely located first and second ends, each of the adjacently positioned projecting portions is narrower at the first end relative to the second end.

8. The door handle apparatus for the vehicle according to claim 7, wherein the plurality of spaced apart projecting portions directly overlies the sensing electrode which is inside the door handle upper-outer surface so that the projecting portions facilitate removal of water on the upper surface of the door handle which is directly overlying the sensing electrode.

9. The door handle apparatus for the vehicle according to claim 7, wherein the plurality of projecting portions includes two rows of projecting portions, with each row including a plurality of the spaced apart projecting portions.

10. A door handle apparatus for a vehicle comprising:
    a door handle configured to be mounted at an exterior of a vehicle door and operated to open/close the vehicle door, the door handle possessing an upper surface facing upwardly when the door handle is mounted on the vehicle door;
    a sensing electrode located inside the door handle;
    a sensor for detecting a user approaching the sensing electrode based on a variation of an electric capacitance generated by the sensing electrode;
    controlling means for controlling the vehicle door to be locked/unlocked based on information detected by the sensor;
    a plurality of spaced apart projecting portions on the upper surface of the door handle and upstanding from the upper surface of the door handle to remove water retained in the vicinity of the sensing electrode;

wherein the plurality of projecting portions includes two rows of projecting portions, with each row including a plurality of the spaced apart projecting portions; and wherein each of the spaced apart projecting portions possesses oppositely located first and second ends, and each of the projecting portions in one row is narrower at the first end relative to the second end.

11. A door handle apparatus for a vehicle comprising:

a door handle configured to be mounted at an exterior of a vehicle door and operated to open/close the vehicle door, the door handle possessing an upper surface facing upwardly when the door handle is mounted on the vehicle door;

a sensing electrode located inside the door handle;

a sensor for detecting a user approaching the sensing electrode based on a variation of an electric capacitance generated by the sensing electrode;

controlling means for controlling the vehicle door to be locked/unlocked based on information detected by the sensor; and water-removing means for removing water on the upper surface of the door handle, the water-removing means directly overlying the sensing electrode inside the door handle upper-outer surface; and wherein the water-removing means comprises at least three spaced-apart projecting portions which project away from the upper surface of the door handle, with adjacent pairs of projecting portions separated by a respective space having a shape with widens towards one end of the respective space.

12. The door handle apparatus for the vehicle according to claim 11, wherein the water-removing means comprises at least four spaced-apart projecting portions which project away from the upper surface of the door handle.

* * * * *